April 21, 1925.  1,534,976
C. A. LONGMAN
CHAIN COUPLING
Filed Oct. 27, 1924
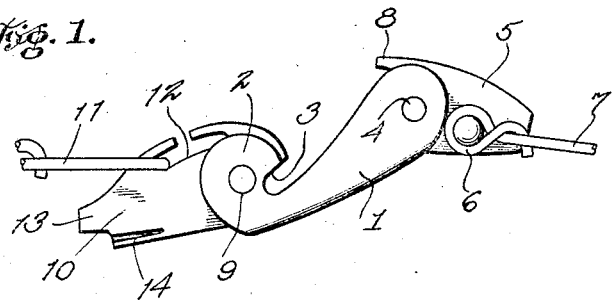
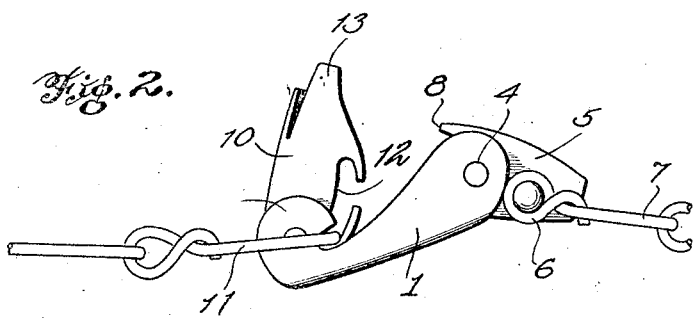
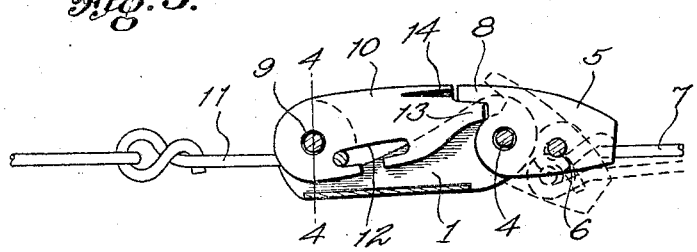
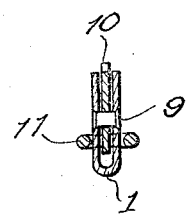
C. A. Longman
INVENTOR
BY Victor J. Evans
ATTORNEY
R. E. Wise.
WITNESS:

Patented Apr. 21, 1925.

1,534,976

UNITED STATES PATENT OFFICE.

CHARLES A. LONGMAN, OF LOGAN, IOWA.

CHAIN COUPLING.

Application filed October 27, 1924. Serial No. 746,154.

*To all whom it may concern:*

Be it known that I, CHARLES A. LONGMAN, a citizen of the United States, residing at Logan in the county of Harrison and State of Iowa, have invented new and useful Improvements in Chain Couplings, of which the following is a specification.

The object of my invention is the provision of a coupling through the medium of which the ends of an automobile chain may be expeditiously and securely connected in a detachable manner so that loss of the chain is precluded and so that when desired the ends of the chain may be readily disconnected.

Other objects and practical advantages of the invention will be fully understood from the following description and claims when the same are read in connection with the drawing, accompanying and forming part of this specification, in which:—

Figure 1 is a side elevation showing my novel coupling as open.

Figure 2 is a similar view showing the manner in which the coupling is closed.

Figure 3 is a longitudinal section of the fully closed coupling.

Figure 4 is a transverse section taken in the plane indicated by the line 4—4 of Figure 3.

Similar numerals of reference designate corresponding parts in all of the views of the drawing.

Among other elements my novel coupling comprises a body 1 of sheet steel or other appropriate material. The said body 1 is generally of U-shape in cross-section, Figure 4, and is provided with a head 2 and a recess 3 under said head.

Pivotally connected at 4 in the heel portion of the body 1 is a rear member 5, also preferably of steel, and permanently connected at 6 to one end of a tire chain 7. At its forward end the member 5 is provided with a finger 8 as illustrated in Figures 1 to 3.

Pivotally connected at 9 in the head portion 2 of the body 1 is a lever member 10 which is also preferably, though not necessarily, of sheet steel. The said member 10 is designed to engage a link 11 at the opposite end of the tire chain, and toward said end the lever member 10 is provided in its inner edge with a recess 12 of general T-form. It will also be noticed that the lever member 10 is provided with a reduced end portion 13 and with a lateral flange 14, the latter being designed to afford a finger hold when the parts are relatively arranged as shown in Figure 3.

Manifestly when the member 5 is positioned as shown by dotted lines in Figure 3, the said member 5 will permit the reduced end 13 of the lever member 10 to enter the body 1, after which the finger 8 at the inner end of the member 5 may be arranged at the outer side of the end portion 13 of the lever member 10 as appears in full lines in Figure 3.

It will also be apparent from the foregoing that in adjusting the lever member 10 from the position shown in Figure 1 to that shown in Figure 3 slack in the tire chain will be taken up, and when the lever member 10 is in a position shown in Figure 3 pull exerted on the link 11 toward the left will tend to retain the lever member 10 in the body 1 and against the back wall of said body 1. When, however, it is desired to disconnect the link 11 it is simply necessary to swing the lever member 10 from the position shown in Figure 3 to that shown in Figure 1.

An important feature of my novel coupling resides in the capacity of the coupling to exclude from its interior ice and mud so that the coupling will be in a workable condition in all kinds of weather.

While designed more particularly for use on tire chains, my novel coupling obviously may be used in other relations where a continuous chain is employed.

I have specifically described the preferred embodiment of my invention in order to impart an exact understanding of said embodiment. I do not desire, however, to be understood as confining myself to the specific disclosure inasmuch as my invention is defined by my appended claims within the scope of which changes may be made without affecting my invention.

Having described my invention, what I claim and desire to secure by Letters-Patent, is:—

1. A chain coupling comprising a body of U-shape in cross-section having a head and a recess in said head, a member pivotally connected in and to the heel portion of the body and adapted to have its outer portion permanently connected to one end of a chain and having a finger on its inner portion at one of its edges, and a lever member pivotally connected in the head portion of the body and having a reduced free end portion arranged to rest within and against said finger, and also having a T-shaped recess in its inner edge and a lateral flange on its outer edge.

2. A chain coupling comprising a body having a head at one end and a recess in said head, a member pivoted to the heel portion of the body and having a finger, and a lever member pivoted to the head portion of the body and having a T-shaped recess in its inner edge and also having an end portion relatively arranged to assume a position within and against the finger of the said pivoted member when the coupling is in a closed state.

In testimony whereof I affix my signature.

CHARLES A. LONGMAN.